United States Patent Office 3,324,906
Patented June 13, 1967

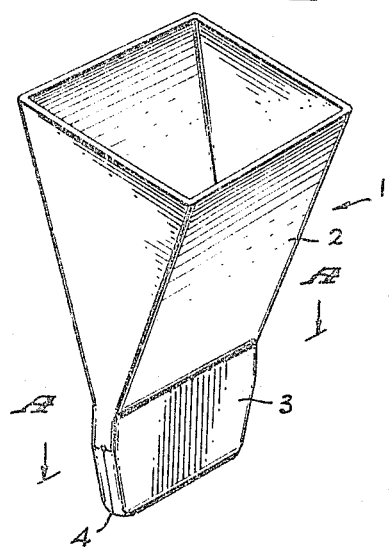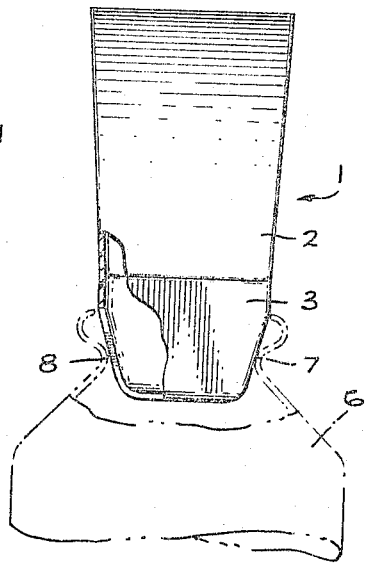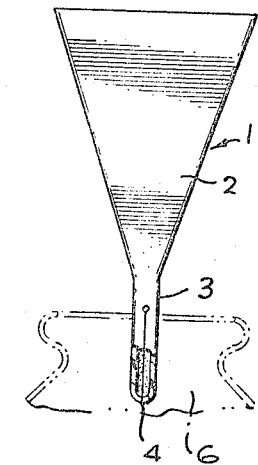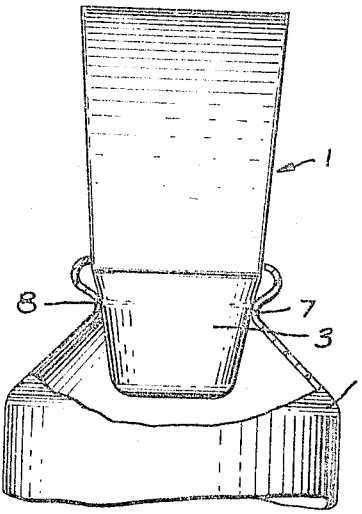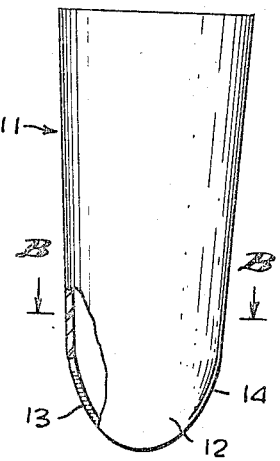
INVENTOR.
STEVEN S. CHU

3,324,906
FUNNEL
Stephen S. Chu, Los Angeles, Calif., assignor to Carnation Company, Los Angeles, Calif., a corporation of Delaware
Filed Mar. 20, 1964, Ser. No. 353,360
1 Claim. (Cl. 141—114)

This invention relates to a resilient funnel which automatically releases its contents when lateral pressure is exerted on the funnel spout.

It is an object of this invention to provide a funnel for conveniently transferring material from one container to another without spilling or wasting the material. Another object is a funnel which will accurately measure a given quantity of material and remain sealed during the measurement and transfer of the material from one container to another. A still further object is an inexpensive funnel and measuring device which may be mass produced at low cost.

FIGURE 1 is an oblique view showing an embodiment of the funnel in perspective.

FIGURE 2 is a side view of an embodiment of the funnel showing it resting in the mouth of a container.

FIGURE 3 is an end view of the funnel. It also shows the funnel resting in the mouth of a container.

FIGURE 4 is a cross section along lines A—A of FIGURE 1, and it shows the construction of the funnel spout.

FIGURE 5 is a side view of the funnel showing it depressed into the mouth of a container.

FIGURE 6 is an end view of the funnel showing it depressed into the mouth of the container.

FIGURE 7 is a side view of an alternative embodiment of the funnel.

FIGURE 8 is a cross section along the lines B—B of FIGURE 7. This figure shows the elliptical shape of the alternative embodiment.

The present invention is directed to a normally closed resiliently openable funnel of improved construction. The funnel is formed of an upper portion having an open top and bottom and generally tapering side walls, which upper portion acts as a receptacle for material to be dispensed from the funnel. The funnel also includes a lower portion consisting of a resilient discharge spout integrally connected to the upper portion and, in turn, divided into two portions. Thus, the spout includes two opposed, narrow spaced side walls connected to two opposed broad spaced side walls, the side walls being connected at the bottom to a bottom wall. The bottom wall and a major portion of each of the narrow side walls of the spout are divided longitudinally into two equal complementary halves. The overall shape of the spout is relatively flat and wedge shaped with the broad side walls tapering downwardly so that inwardly directed pressure on the narrow side walls causes the split complementary portions of the spout to separate to a width substantially greater than that represented by the spout when closed. The net effect is to provide a normally closed spout which is readily openable to provide a relatively wide discharge opening for rapid and complete expulsion of contents of the funnel.

FIGURES 1 through 6 illustrate the principle of the invention, and the construction of an embodiment of the invention. In FIGURE 1, the funnel 1 is composed of a vessel 2 and a spout 3. In this embodiment, the funnel 1 is in the shape of a truncated rectangular pyramid. The spout 3 is integral with the vessel 2. The spout forms a split doubel reed, the sections of the reed being formed by the split 4.

Referring to FIGURE 2, the funnel 1 is shown resting in the mouth of a container 6, in this case an ordinary milk bottle. The lower portion of the funnel 3 is wedge shaped so that when the funnel is depressed into the neck of the bottle 6, lateral pressure is applied to the funnel at points 7 and 8.

FIGURE 3 is an end view of the funnel shown in the same position as in FIGURE 2. The split 4 divides the funnel into two sections. The cross section shown in FIGURE 4 further illustrates the split 4 and the shape of the spout 3. Functionally, the important feature of the spout 3 is that it be resilient. By this it is meant that the spout returns to its illustrated shape after being distorted so as to substantially seal the spout by closing the split 4. The funnel is intended as a disposable item; therefore, it need only be designed to withstand about 25 to 100 uses.

FIGURES 5 and 6 particularly illustrate the operation of the funnel. In these views, the funnel 1 is depressed into the mouth of the bottle 6 so that the spout 3 is wedged against the circumference of the mouth of the bottle at 7 and 8. Depression of the funnel into the mouth of the bottle 6 causes lateral pressure to be exerted against the sides of the funnel at 7 and 8. Referring specifically to FIGURE 6, the effect of the lateral pressure is clearly illustrated. The lateral pressure applied to the funnel spout 3 at points 7 and 8 causes the split reed spout to open along the split 4 and release the contents of the funnel into the bottle 6. Upon removing the funnel spout from its wedged position against the mouth of the bottle 6, the resilience of the spout 3 causes the spout to return to its normal position, thereby substantially sealing the opening 4.

The funnel may be constructed of any resilient material such as plastic or rubber; however, an inexpensive plastic such as polyethylene or polypropylene is preferred. It should be appreciated that the spout in its normal position may not form a perfect seal which would positively contain a liquid such as water. Therefore, the preferred materials for use in the funnel are flowable powder, solid particles and pellets. For example, animal feeds, powdered milk, flour or coffee may be used.

Calibrations may be placed vertically along the funnel to indicate the volume. In this manner the funnel may be used to measure a given quantity and to transport the measured material into a mixing container without spilling the contents.

FIGURES 7 and 8 illustrate an alternative embodiment of the funnel. In this embodiment, the funnel 11 is elliptical. This construction has an advantage in that it eliminates the restriction caused by the intersection of the vessel 2 and spout 3 in the rectangular embodiment. In the funnel 11, the bottom 12 is oval rather than wedge shaped. However the elliptical embodiment operates the same as the rectangular embodiment, shown in 1 through 6, in that lateral pressure is applied at 13 and 14. The lateral pressure distorts the resilient funnel causing the opening 15 to release the contents of the funnel 11.

An example of the funnel's use is as follows: Instant non-fat dry milk is generally reliquefied prior to use. It is common to use a quart milk bottle as a container for mixing water and instant non-fat dry milk. For best results, it is recommended that 1⅓ cups of instant nonfat dry milk be added to make a quart of liquid milk. Using the funnel of the invention, which is calibrated to measure 1⅓ cups, an accurate amount of instant nonfat dry milk is transferred to the mixing bottle by simply filling the funnel to the desired volume and pressing the spout into the neck of the mixing bottle.

It will be appreciated that the lateral pressure applied to the sides of the funnel can be supplied by the hand or by forcing the funnel into a restriction.

While the invention has been illustrated through particularly preferred embodiments, it should be understood that these are only illustrative. Accordingly, variations and modifications will occur to those skilled in the art, and it is intended that such variations and modifications which fall within the scoep of the appended claim be included.

Having described the invention, what is claimed is:

A normally closed, resiliently openable funnel having:
(A) A vessel consisting of spaced downwardly tapering side walls defining an open top and bottom and,
(B) A resilient, generally flat, wedge-shaped discharge spout formed of (1) two normally parallel spaced apart, flat side walls, the lower ends of which have a downwardly converging trapezoidal shape, (2) two spaced apart narrow side walls the lower portion of which converge downwardly and (3) a bottom wall integrally connected to the bottom of each side wall of the spout, the upper end of each of the side walls of the spout (B) being integrally connected to the lower end of the side walls of the vessel (A), the entire bottom wall (3) and a major portion of each of the two opposed narrow side walls (2) of the spout (B) being divided longitudinally into two equal complementary parts forming a lower resilient normally closed but readily openable split reed discharge end in the spout (B), the complementary parts being readily movable between a normally closed position and an open position of substantially greater width than the closed portion to facilitate discharge of material from the funnel upon the application of forces normal to said narrow side walls.

References Cited

UNITED STATES PATENTS

| 998,052 | 7/1911 | Treiber | 222—490 X |
| 2,488,854 | 11/1949 | Crane | 222—490 X |
| 2,606,327 | 8/1952 | Eckart et al. | 141—331 X |
| 2,922,178 | 1/1960 | Kelly | 222—490 X |

FOREIGN PATENTS 217,133  9/1961  Austria.

LAVERNE D. GEIGER, *Primary Examiner.*

E. J. EARLS, *Assistant Examiner.*